United States Patent [19]
Anderson et al.

[11] 3,862,060
[45] Jan. 21, 1975

[54] PHENOLIC RESIN EMULSIONS COMPRISING A RESOLE RESIN AND A SOLUBLE PROTEIN

[75] Inventors: George J. Anderson, East Longmeadow; Woodrow H. Ingram, II, Hampden, both of Mass.

[73] Assignee: Monsanto Company, St. Louis, Mo.

[22] Filed: Oct. 29, 1973

[21] Appl. No.: 410,853

[52] U.S. Cl. .......................................... 260/7, 260/6
[51] Int. Cl. ......................... C08g 37/18, C08h 7/02
[58] Field of Search .......................................... 260/7

[56] References Cited
UNITED STATES PATENTS
3,666,694   5/1972   Ingram .................................... 260/7

FOREIGN PATENTS OR APPLICATIONS
508,976   1/1955   Canada ................................. 260/7
688,222   3/1953   Great Britain ........................ 260/7

*Primary Examiner*—Melvin Goldstein
*Assistant Examiner*—Edward Woodberry
*Attorney, Agent, or Firm*—R. Bruce Blance; Edward P. Grattan; James C. Logomasini

[57] ABSTRACT

Stable emulsions containing high concentrations of thermosettable phenol-formaldehyde resole resins as the dispersed phase. The emulsions comprise a resole with a formaldehyde-phenol ratio in the range of 0.85:1 to 3:1 and a water tolerance of less than 40 percent, in aqueous emulsion stabilized with a proteinaceous compound soluble in aqueous media at a pH of 7–10. The resole resins are prepared with amine catalysts and preferably are modified with melamine. The emulsions contain a small amount of alkali hydroxide and optionally urea or dicyandiamide. They are useful in the preparation of surface coatings and in the impregnation of cellulosic substrates.

19 Claims, No Drawings

PHENOLIC RESIN EMULSIONS COMPRISING A RESOLE RESIN AND A SOLUBLE PROTEIN

BACKGROUND OF THE INVENTION

1. Field of the Invention

The present invention relates to stable emulsions containing high concentrations of thermosettable phenol-formaldehyde resole resins as the dispersed phase stabilized with proteinaceous compound.

2. Description of the Prior Art

The concept of phenolic resin emulsions is in general well known in the prior art and such emulsions have been recommended for use in impregnations and beater additive applications. However, the emulsions heretofore described have been made generally with modified phenol resins, prepared with, e.g., cresol, tung-oil modified phenol, sulfonated phenol and the like. The emulsifiers used have been a combination of a protective colloid and a surfactant which is a salt of an organic acid, such as sulfonated vegatable oil, or sodium oleate. Furthermore, the phenolic resin emulsions of the prior art have formerly been prepared by adding solutions of phenolic resoles in organic solvents to a solution of emulsifier and/or protective colloid with very vigorous agitation. This required the use of a colloid mill or gear pump in order to obtain emulsification. Alternatively, the phenolic resin was dissolved in a water insoluble solvent and the solution then emulsified with various combinations of protective colloid and surfactant such as casein and sulfonated vegetable oil and the water insoluble solvent subsequently removed.

More recently, Ingram, in U.S. Pat. No. 3,666,694, disclosed emulsifiable phenolic resins which may be emulsified by addition of water to give phenolic resin emulsions containing from about 5 to 45 percent resin solids. However, although such emulsions are a significant advance in the art, for many applications higher solids emulsions would be preferred since they would allow more efficient treatment of substrates and they would contain less water to be driven off in the drying step which accompanies many of the treating processes. Moreover, the higher solids emulsions would provide substantial economies in shipping and handling of the emulsions. Thus, there exists a need in the art for stable thermosettable phenol-formaldehyde resole resin emulsions of high solids content.

SUMMARY OF THE INVENTION

The need is fulfilled by the present invention which provides stable thermosettable phenol-formaldehyde resole resin emulsions containing 45.1 to 70 weight percent of solids. The solids contain from 80 to 99 parts by weight per 100 parts by weight of solids of a phenol-formaldehyde resole resin characterized by a formaldehyde to phenol mole ratio in the range of from about 0.85:1 to about 3:1, a water tolerance of less than 40 percent, and about 1 to 20 parts by weight of a proteinaceous compound per 100 parts by weight of solids, the proteinaceous compound being soluble in aqueous media at a pH of 7 to 10. The emulsion is further characterized by a pH in the range of 7 to 11, a particle size of the disperse phase in the range of 0.01 to 2.0 microns and a concentration of 0.005 to 5.5 percent of an alkali metal hydroxide.

The phenol-formaldehyde resole resin is the product of condensation of a phenol and formaldehyde in the presence of a catalyst selected from the group consisting of ammonia, hexamethylenetetramine and aliphatic and aromatic amines of molecular weight less than 300, the catalyst concentration being in the range of between 0.1 and 20 parts by weight per 100 parts by weight of phenol. The catalyst may additionally comprise alkali metal hydroxide.

The aqueous emulsion may be advanced by heating to the thermoset stage.

In a preferred embodiment of the invention, the phenol-formaldehyde resole resin is modified with an aminotriazine compound selected from the group consisting of melamine, guanamine and benzoguanamine. In general, the resulting aminotriazine modified product contains from about 2 to 25 parts by weight of aminotriazine per 100 parts by weight of phenol in the resole. The emulsion may contain additional components especially additives such as urea and dicyandiamide to modify the viscosity of the protein solution and to reduce the free formaldehyde in the emulsion.

Another aspect of the invention comprises processes for stable thermosettable resole resin emulsions in which the resole is prepared by condensing a phenol and formaldehyde in the presence of a catalyst comprising an amine and optionally an alkali metal hydroxide, adding an aqueous solution of proteinaceous compound to form a water-in-oil emulsion, adding alkali metal hydroxide to give a concentration between 0.005 and 5.5 percent of the final emulsion, stirring the water-in-oil emulsion and adding water to cause phase inversion and form an oil-in-water emulsion with a disperse phase of particle size in the range 0.01 to 2.0 microns and resin solids in the range of 45.1 to 70 percent.

Another aspect of the invention comprises cellulosic substrates impregnated with the resole resin emulsions described above and heat treated to advance the resole resin to the thermoset stage.

PREFERRED EMBODIMENTS

Phenol-formaldehyde resole condensates are well known to those familiar with the art. In general, suitable phenol-formaldehyde resole condensates may be prepared by first condensing from about 0.85 to 3 moles of formaldehyde per mole of phenol using a nitrogenous catalyst.

For the preparation of high solids emulsions, the phenol-formaldehyde resole condensate must have a water tolerance of less than 40 percent by weight based on resin solids. Water tolerance is a measure of resin advancement. If tolerance is too high, the resin will not form an oil-in-water emulsion in the solids range of 45.1 to 70 percent but rather a solution or a water-in-oil emulsion which has characteristically poor storage stability. Water tolerance is determined at 25°C. by addition of water to the resole condensate until a slight permanent haze forms. Preliminary to the determination of the haze point, it may be necessary to remove water from the aqueous two-phase dispersion of resole condensate by distillation under reduced pressure at a temperature below 60°C. until the condensate forms a clear solution. The tolerance is the weight of water expressed as a percent by weight of the resin solids. Thus, where the haze point occurs when 40 parts by weight of water impart haze to 100 parts by weight of resole resin solids, the tolerance is 40 percent.

The resole resins are prepared by condensing formaldehyde with phenol or substituted phenols or mixtures thereof. Substituted phenols include phenols which have at least two reactive positions ortho or para to the phenolic hydroxyl and at least one attached radical selected from the group consisting of alkyl, aryl, cycloalkyl, alkenyl, cycloalkenyl, alkaryl, aralkyl, carbocyclic, halogen and mixtures thereof.

Examples of substituted phenols include: Phenols substituted with straight and branched chain alkyl radicals having 1 to 16 carbon atoms, e.g., o-, m- or p-cresol, o-, m- or p-isopropylphenol, o-, m- or p-n-butylphenol, o-, m- or p-t-butyl phenol, 2,3-xylenol, 3,5-xylenol, 3,4-xylenol, mono-substituted amyl, octyl, nonyl, decyl and dodecyl phenols; aryl substituted phenols, e.g., p-phenylphenol and p-($\alpha$-naphthylphenol; cycloalkyl phenols, e.g., o-, m- and p-cyclohexyl phenol, and o-, m- and p-cyclopentyl phenol; cycloalkenyl phenols, e.g., o- and p-cyclopentenyl phenol and o- and p-dicyclopentadienyl phenol; alkenyl phenols, e.g., o- and p-allylphenol, o- and p-(2-butenyl) phenol; alkaryl phenols, e.g., o- and p-tolylphenol, o- and p-xylylphenol, o- and p-propylphenylphenol; aralkyl phenols, e.g., o- and p-benzyl phenol, o- p-phenethylphenol, o- and p-($\beta$-indanyl) phenol, o- and p-cumylphenol bisphenol A, and bisphenol F; halophenols, e.g., o-, m- and p-chlorophenols and o-, m- and p-bromophenols, etc. The preferred phenols are phenol and mixtures of phenol and substituted phenols selected from the group consisting of o-, m- and p-cresol, p-t-butylphenol, o- and p-phenethylphenol, o- and p-cyclopentenylphenol, o- and p-dicyclopentadienyl phenol and o- and p-($\beta$-indanyl) phenol in a weight ratio of up to 60 parts of substituted phenol to 100 parts of phenol since such mixtures provide resoles with adequate reactivity and superior water resistance when thermoset.

Preferred phenol-formaldehyde resins are those which are modified with an aminotriazine such as melamine, guanamine and benzoguanamine. The preferred aminotriazine is melamine. In one procedure, the aminotriazine is added initially with the phenol and formaldehyde and condenses with formaldehyde concurrently with the phenol. In another procedure, the aminotriazine is added after the formaldehyde and phenol have partially reacted. In another procedure, aminotriazine formaldehyde condensate separately prepared is added to a phenol-formaldehyde condensate. In general, the resulting aminotriazine modified product contains from about 2 to 25 parts by weight of aminotriazine based on 100 parts of phenol. Aminotriazine modified resins are preferred because of the improved stability found in emulsion prepared from the aminotriazine modified resoles of the present invention. For example, these emulsions exhibit substantially no sedimentation even upon storage for six months at room temperature.

The condensation of phenol and formaldehyde is carried out in the presence of a nitrogenous catalyst such as ammonia, hexamethylenetetramine and aliphatic or aromatic amines of molecular weight less than about 300. The aliphatic primary, secondary and tertiary amines contain $C_1$-$C_{18}$ alkyl groups attached to the amino nitrogen atom. Exemplary of the aliphatic amines are methylamine, decylamine, octadecylamine, ethylenediamine, dimethylamine, di-decylamine, trimethylamine, triethylamine, triethanolamine, and trihexylamine. Exemplary of the aromatic amines are aniline, $\alpha$- and $\beta$-naphthylamines and p-phenylenediamine. The concentration of catalyst is in the range of 0.1 to 20 parts by weight per 100 parts by weight of phenol. It is desirable that the condensation be continued until the free formaldehyde content is less than 1.5 percent to minimize subsequent reaction with the proteinaceous emulsifiers described herein since such reaction tends to de-stabilize the emulsion.

When a resole resin is prepared with an alkali metal hydroxide as the catalyst, the resole does not yield a resin-in-water emulsion with a solids content of greater than 45 percent unless the water tolerance is substantially below 40 percent. Moreover, for some reason which is not completely understood, the resole prepared with such catalysts must be advanced to such a degree to obtain a water tolerance of less than 40 percent, that the high molecular weight and concomitant high viscosity make it exceedingly difficult or impractical to disperse the aqueous solution of proteinaceous compound in the resole resin and thus prevent the formation of an emulsion from such a resole resin. The viscosity of the resole resin should be less than 100,000 cps. at the emulsification temperature, and preferably less than 50,000 cps. for good dispersibility. It is, therefore, a feature of this invention that a nitrogenous catalyst as described herein must be used in order to obtain a resole resin with the requisite low water tolerance for a high solids emulsion and with a viscosity sufficiently low to allow dispersibility of the aqueous solution of the proteinaceous compound in the resole and subsequently phase inversion of the water-in-oil emulsion to an oil-in-water emulsion. However, the rate of the condensation reaction catalyzed with a nitrogenous catalyst may be enhanced by a co-catalyst of an alkali metal hydroxide. The co-catalyst is present in the range of up to 5.0 parts by weight per 100 parts of phenol.

It is another feature of the invention that whether or not an alkali metal hydroxide is present in the resole resin condensation mixture, it must be present in the mixture of resole resin condensate and proteinaceous compound when water is added, in order to achieve phase inversion and form a stable resin-in-water emulsion. The amount necessary to induce phase inversion and provide a stable emulsion is between 0.005 and 5.5 percent by weight of emulsion. The pH of the emulsion ranges from 7 to 11. For improved stability, it is preferably in the range of 8 to 9.5.

The alkali solubilizable proteinaceous compounds used in this invention are well known to those of ordinary skill in the art. In general, they are amphoteric but are used in the present invention only at a pH of from 7 to 10. The most commonly used proteinaceous materials of this type are casein and soya proteins; molecular weights generally range from 100 thousand to 400 thousand. Suitable aqueous solutions of the proteinaceous compound may be prepared in the presence of alkali metal hydroxides, alkali metal carbonates, ammonium hydroxide and organic amines. The solution of proteinaceous compound contains between 10 and 30 percent of proteinaceous compound. If an alkali metal hydroxide is used in the preparation of the solution of proteinaceous compound, it forms part of the total amount of alkali metal hydroxide required for phase inversion of the resole resin. The amount of proteinaceous compound which is added to the resole resin is in the range of 1 to 20 parts per 100 parts of solids. It is advantageous to add urea or dicyandiamide to the aqueous solution of protein as a viscosity depressant.

The urea or dicyandiamide also acts to reduce the free formaldehyde when the aqueous solution is added to the resole resin. The amount of urea or dicyandiamide effective for these purposes is in the range of 1 to 40 parts by weight per 100 parts of solids with a corresponding reduction in the amount of resole resin in the solids.

While the phenol-formaldehyde condensation reaction is generally carried out in an aqueous medium with a formalin solution containing between 30 and 60 weight percent formaldehyde or in an anhydrous medium with para-formaldehyde, optionally there may be present an organic solvent which is a solvent for the phenol-formaldehyde resole resin or which is a mutual solvent for the resole resin and water. The solvent is removed from the resole resin prior to the addition of the aqueous solution of proteinaceous compound. However, the resole resin condensate can contain up to 20 percent of a solvent for the resole resin or of a mutual solvent for the resole resin and water provided the water tolerance is less than 40 percent.

The formation of the resole resin emulsion can be facilitated at elevated temperatures causing a lowering of the viscosity of the resole resin. Temperatures up to 60°C. can be used with advantage. Above 60°C., however, reaction between the resole resin and the proteinaceous compound may become appreciable and the stability of the emulsion may be adversely affected.

The resole resin may be a clear solution or a water in oil emulsion depending upon the ratio of formaldehyde to phenol, the degree of advancement of the resin and the amount of water in the original formaldehyde source. When the aqueous solution of proteinaceous compound is added, a somewhat viscous water-in-oil emulsion is formed. Provided sufficient alkali metal hydroxide is present in the admixture, addition of water causes the viscosity to build rapidly to a peak at the point when the system inverts to a resin in water emulsion. Thereafter, the viscosity decreases sharply with the further addition of water. If there is insufficient alkali metal hydroxide present in the admixture, no phase inversion occurs when water is added. The viscosity rises to a peak with the addition of water then falls slowly until a point is reached at which the resole resin is precipitated as a stringy mass. However, if the necessary amount of alkali metal hydroxide is added to the dispersion at the stage of water dilution beyond the point where inversion would have occurred if the alkali metal hydroxide had been present, and before the point of stringing of the resole, phase inversion occurs immediately and the viscosity drops to the level which it would have attained at the same concentration of water if alkali metal hydroxide had been present initially. During the emulsification step, agitation is effected by any conventional means which will generate a shear field. It is advantageous to carry out the preparation of the resole resin in a conventional kettle by a batch process. The agitators of such conventional kettles are generally adequate to emulsify the resole resin. The batch process can be conveniently carried out by condensing the phenol and formaldehyde to the required level of water tolerance and emulsification can then be carried out without a dehydration step to remove the water present in the condensation reaction mixture.

The resin in water emulsions formed are characterized by excellent stability with regard to sedimentation and shear. Particle size is also extremely small, in all cases being below 2 microns and normally averaging in the range of 0.02 to 0.8 micron. The particle size is inversely related to the concentration of alkali metal hydroxide. In general, small particle size is associated with high emulsion viscosity.

The resin emulsions of this invention are useful in the preparation of surface coatings and in the impregnation of cellulosic sheet members. Typical resin solids contents of the resin emulsions for cellulosic sheet impregnation range from about 5 percent up to 70 weight percent resin solids. Thus, at the time of application, the emulsions are diluted with water to the appropriate solids content. Impregnation is accomplished by any convenient means including dipping, coating, or the like. After impregnation, the substrate material is dried to remove a substantial part of the volatiles and then is heated to advance the resin to the desired degree. Typical quantities of resin in a treated sheet range from about 10 to 60 weight percent with amounts ranging from about 15 to 30 weight percent being particularly common. A typical product in which the resin treated sheet members are employed comprises automotive oil filters, air filters and fuel filters, the individual sheets being folded, convoluted, etc. and then packaged in an appropriate filter cartridge, all as those skilled in the art fully appreciate. Advantages of high solids emulsions in the range of 45 to 70 percent include one-pass treatment of the substrate, and reduction in the volatile component yielding improved drying efficiency.

The emulsions of the present invention may be formulated with lubricants, defoamers, plasticizers, softening agents, pigments and other adjuncts without departing from the scope of the invention. In particular, where the emulsions are used in impregnation of cellulosic substrates, they are advantageously formulated with anti-migratory agents of the type described in U.S. Pat. No. 3,719,616.

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLES 1 – 10

Preparation of Liquid Resole Resins

A series of resole resins is prepared by the following procedure: The reaction components and catalyst are charged to a reactor which is equipped with stirrer, thermometer and reflux condenser. The reactor is heated to reflux under a pressure reduced from atmospheric. Reflux is maintained until the reaction is complete. The cloud point and water tolerance are determined. Data for the series are presented in Table I.

EXAMPLES 11 – 20

Preparation of Resole Resin Emulsions

A solution of proteinaceous compound is prepared by dissolving urea in water. Casein is added to form a slurry. Aqueous base is then added to the slurry which goes into solution after approximately 30 minutes stirring.

The solution of proteinaceous compound is added to the entire quantity of resole sample as set forth in Table I at a temperature of about 45°C., the rate of addition being adjusted to avoid lump formation and to distribute the proteinaceous solution evenly throughout the resole. Water is added with sufficient agitation to achieve good mixing. The dispersion viscosity rises to a maximum after approximately three quarters of the water has been added and phase inversion occurs, the dispersion acquiring a milky light yellow appearance. When all the water has been added, the emulsion is cooled to 25°C. The solids content of the emulsion is determined by ASTM test procedure D115-55 and the viscosity by means of a Brookfield LVF viscosimeter at 25°C. Data for various emulsions are presented in Table II. In some examples, alkali metal hydroxide solution is added to the resole prior to addition of the proteinaceous solution. Example 15 which is prepared from resole Example 5 with sodium hydroxide as the sole catalyst and a water tolerance of 5 is very difficult to disperse; indeed, dispersion is incomplete and a substantial amount of the resole remains on the walls of the reactor undispersed. Moreover, the resin solids of the dispersion is only 44 percent. In contrast, Example 18 which is prepared from amine catalyzed resole Example 8 with water tolerance of 35, provides a uniformly dispersed stable resin-in-water emulsion with a solids content of 48 percent. The other amine catalyzed resoles similarly provide uniformly dispersed stable emulsion Examples 11–14 and 16–20.

The resin-in-water emulsion examples when cast onto glass plates and dried at 150°C for 10 minutes produce thermoset films which display excellent water resistance. The high solids and high viscosity of the emulsions allow thick films to be prepared.

EXAMPLES 21-27
Effect of Amount of Alkali Metal Hydroxide

These examples are set forth to show the effect of the amount of alkali metal hydroxide on the resole resin emulsion. Resole resin samples prepared from the quantities of reactants and under the conditions set forth in Examples 2 and 3 are treated with various amounts of sodium hydroxide. The proteinaceous solution set forth in Example 12 is added, followed by water to cause phase inversion and formation of the resin-in-water emulsion. The results are presented in Table III.

TABLE I

RESOLE RESINS

| EXAMPLE | 1 | 2 | 3 | 4 | 5 | 6 | 7 | 8 | 9 | 10 |
|---|---|---|---|---|---|---|---|---|---|---|
| Phenol | 100 | 100 | 100 | 100 | 100 | 100 | 100 | 100 | 100 | 100 |
| 50% Formalin | 80 | 85 | 85 | 85 | 85 | 85 | 85 | 125 | 81 | 85 |
| Melamine | — | 5 | 5 | 5 | — | 5 | 5 | 5 | 5 | 5 |
| 50% NaOH Solution | — | — | — | — | 0.4 | 0.8 | 0.8 | 2.5 | 1.3 | 0.8 |
| Amine | 3TA | 3TA | 8NH$_4$OH | 3TA | — | 4.5 | 2.6 MEA | 5 HEXA | 1.5 HEXA | 5 AN |
| Reflux Temp. °C. | 95 | 95 | 75 | 95 | 100 | 85 | 90 | 80 | 90 | 90 |
| Reflux Time, mins. | 145 | 155 | 330 | 135 | 150 | 344 | 150 | 90 | 175 | 95 |
| Water Tolerance, % | 12 | 13 | 2 | 12 | 5 | 16 | 12 | 35 | 13 | 6 |

TA=triethylamine; MEA=monoethanolamine; HEXA=hexamethylenetetramine; AN=aniline; NH$_4$OH=30% aqueous ammonia.

TABLE II

RESOLE EMULSIONS

| EXAMPLE | 11 | 12 | 13 | 14 | 15 | 16 | 17 | 18 | 19 | 20 |
|---|---|---|---|---|---|---|---|---|---|---|
| Resole Resin Ex. No. | 1 | 2 | 3 | 4 | 5 | 6 | 7 | 8 | 9 | 10 |
| 50% Aqueous NaOH | — | 0.11 | — | — | — | — | — | — | — | — |
| Proteinaceous Solution | | | | | | | | | | |
| Water | 15 | 15 | 15 | 15 | 15 | 15 | 15 | 15 | 15 | 15 |
| Urea | 6.5 | 6.5 | 6.5 | 6.5 | 6.5 | 6.5 | 6.5 | 6.5 | 6.5 | 6.5 |
| Casein | 6.5 | 6.5 | 6.5 | 6.5 | 6.5 | 6.5 | 6.5 | 6.5 | 6.5 | 6.5 |
| 50% NaOH | 0.4 | — | 0.4 | 0.4 | — | 0.4 | 0.4 | 0.4 | 0.4 | 0.4 |
| 30% NH$_4$OH | — | 0.9 | — | — | 0.9 | — | — | — | — | — |
| Emulsion | | | | | | | | | | |
| Solids, wt. % | 53 | 55 | 57 | 57 | 44 | 47 | 51 | 48 | 50 | 49 |
| Viscosity, cps. | 1840 | 1000 | 175 | — | 196 | 1510 | 2300 | 700 | 4000 | 1120 |
| (Spindle/Speed) | (3/12) | (3/30) | (2/12) | | (3/30) | (3/30) | (4/60) | (3/30) | (4/60) | (3/60) |

TABLE III

| Ex. | Resole Ex. | Emulsion | | |
|---|---|---|---|---|
| | | NaOH, % | Solids, % | Viscosity, cps. |
| 21 | 2 | 0 | The dispersion does not phase invert; the resin precipitates at approximately 30% solids. | |
| 22 | 2 | 0.022 | 55 | 1000 |
| 23 | 2 | 0.28 | 51 | 3140 |
| 25 | 3 | 0 | The dispersion does not phase invert, the resin precipitates at approximately 30% solids. | |
| 26 | 3 | 0.08 | 57 | 175 |
| 27 | 3 | 5.5 | Unstable emulsion. | |

When sodium chloride, trisodium phosphate or sodium acetate are substituted for sodium hydroxide in Examples 22 and 23, no phase inversion occurs at the water addition step and the resin precipitates in the form of strings when the solids content approaches 30 percent. When lithium hydroxide and potassium hydroxide are substituted for sodium hydroxide in Examples 22 and 23, stable resin-in-water emulsions with solids in the range of 50 to 55 percent are obtained.

EXAMPLE 28

The starting materials and procedure of Example 11 are repeated except that the urea is eliminated. There is produced a product emulsifiable resin which, when emulsified by the procedure of Example 11, has inversion characteristics and water resistance characteristics like those of Example 11.

EXAMPLE 29

The starting materials and procedure of Example 11 are repeated except that dicyandiamide is used in place of urea. There is produced a product emulsifiable resin which, when emulsified by the procedure of Example 11, has inversion characteristics of Example 11 and the thermoset resin has the water resistance properties of the thermoset resole of Example 1.

EXAMPLE 30

The starting materials and procedure of Example 1 are repeated except that 115 parts of a cresol containing 55 percent m-cresol is used in place of phenol. The resole resin is emulsified by the procedure of Example 11 and has inversion characteristics like those of Example 11.

EXAMPLE 31

The starting materials and procedure of Example 1 are repeated except that 30 parts of phenol are replaced with 48 parts of p-t-butylphenol. The resole resin is emulsified by the procedure of Example 11. It has inversion characteristics like those of Example 11. It provides surface coatings of superior water resistance.

EXAMPLE 32

The starting materials and procedure of Example 1 are repeated except that 30 parts of phenol are replaced with 63 parts of a mixture of o- and p-phenethyl phenols. The resole resin is emulsified by the procedure of Example 11. It has inversion characteristics like those of Example 11. It provides surface coatings of superior water resistance.

From the foregoing, it is obvious that many variations are possible in the practice of the invention, without departing from the spirit and scope thereof.

What is claimed is:

1. A stable aqueous emulsion of a thermosetting phenol-formaldehyde resole resin comprising from about 80 to 99 parts by weight of phenol-formaldehyde resole resin and from about 1 to about 20 parts by weight of a proteinaceous compound per 100 parts by weight of solids; wherein the emulsion is characterized by having a solids content in the range of 45.1 to 70 percent, a pH in the range of 7 to 11, a particle size in the range of from 0.01 to 2.0 microns and an alkali metal hydroxide concentration of between about 0.005 and 5.5 percent; wherein the phenol-formaldehyde resole resin is produced by reaction of formaldehyde and a phenol in a mole ratio of from about 0.85:1 to about 3:1 in the presence of a catalyst selected from the group consisting of ammonia, hexamethylenetetramine and amines of molecular weight less than about 300; wherein the resole resin has a water tolerance of less than 40 percent, and wherein the proteinaceous compound is soluble in aqueous media at a pH of 7 to 10.

2. The aqueous emulsion of claim 1 wherein the phenol is selected from the group consisting of phenol, o-, m- and p-cresol, p-t-butylphenol, phenethylphenols, cyclopentenyl phenols, dicyclopentadienyl phenols and β-indanyl phenols.

3. The aqueous emulsion of claim 1 wherein the phenol-formaldehyde resole resin is modified with about 2 to 25 parts by weight of melamine, guanamine or benzoguanamine per 100 parts by weight of phenol in the resole resin.

4. The aqueous emulsion of claim 1 containing from about 1 to about 40 parts by weight of urea or dicyandiamide per 100 parts by weight of emulsion solids.

5. The aqueous emulsion of claim 1 wherein the proteinaceous compound is casein.

6. The aqueous emulsion of claim 1 wherein the proteinaceous compound is soya protein.

7. The aqueous emulsion of claim 1 wherein the alkali metal hydroxide is a co-catalyst in the reaction of formaldehyde and the phenol.

8. A stable aqueous emulsion of a thermosetting resole resin comprising from about 40 to 98 parts by weight of phenol-formaldehyde resole resin, from about 1 to about 20 parts by weight of casein or soya protein and about 1 to about 40 parts by weight of urea or dicyandiamide per 100 parts by weight of solids; wherein the emulsion is characterized by having a solids in the range of 45.1 to 70 percent, a pH in the range of 7 to 11, a particle size in the range of 0.01 to 2 microns, and an alkali metal hydroxide concentration of between about 0.005 and 5.5 percent; wherein the phenol-formaldehyde resole resin is produced by the reaction of formaldehyde, a phenol, and melamine in the presence of a catalyst selected from the group consisting of ammonia, hexamethylenetetramine and amines of molecular weight less than about 300, the mole ratio of formaldehyde to phenol being from about 0.85:1 to about 3:1 and there being between 2 and 25 parts by weight of melamine per 100 parts by weight of phenol; and wherein the resole resin has a water tolerance of less than 40 percent.

9. A process for preparing a stable aqueous emulsion of a thermosetting phenol-formaldehyde resole resin comprising:

A. reacting formaldehyde and a phenol in a mole ratio of from 0.85:1 to 3:1 in the presence of a catalyst selected from the group consisting of ammonia, hexamethylenetetramine and amines of molecular weight less than about 300 to produce a thermosettable phenol-formaldehyde resole resin characterized by a water tolerance of less than 40 percent;

B. adding sufficient aqueous solution of a proteinaceous compound which is soluble in water at a pH in the range of 7 to 10 to provide a water-in-oil emulsion containing from about 1 to 20 parts by weight of proteinaceous compound per 100 parts by weight of solids;

C. adding an alkali metal hydroxide to give a concentration of between 0.005 and 5.5 percent of the emulsion;

D. stirring the water-in-oil emulsion; and

E. adding water to cause phase inversion from the water-in-oil emulsion to an oil-in-water emulsion containing 45.1 to 70 percent solids with an emulsion particle size in the range of from 0.01 to 2.0 microns.

10. The process of claim 9 wherein the catalyst concentration is in the range of 0.1 to 20 parts by weight per 100 parts of phenol.

11. The process of claim 9 wherein up to 5.0 parts by weight of alkali metal hydroxide per 100 parts of phenol is added to the formaldehyde phenol reaction mixture as a co-catalyst.

12. The process of claim 9 wherein the phenol is selected from the group consisting of phenol, o-, m- and p-cresol, p-t-butylphenol, phenethylphenols, cyclopentenyl phenols, dicyclopentadienyl phenols, and β-indanyl phenols.

13. The process of claim 9 wherein the phenol-formaldehyde resole resin is modified with about 2 to 25 parts by weight of melamine, guanamine, or benzoguanamine per 100 parts of resole resin.

14. The process of claim 9 wherein the proteinaceous compound is casein.

15. The process of claim 9 wherein the proteinaceous compound is soya protein.

16. The process of claim 9 wherein the aqueous solution of proteinaceous compound contains sufficient urea or dicyandiamide to provide an emulsion containing from about 1 to 40 parts by weight of urea or dicyandiamide per 100 parts by weight of solids.

17. The aqueous emulsion of claim 1 wherein the phenol-formaldehyde resole resin is advanced to the thermoset stage.

18. A substrate impregnated with the emulsion of claim 1 and heat-treated to advance the phenol-formaldehyde resole resin to the thermoset stage.

19. A substrate coated with the emulsion of claim 1 and heat-treated to advance the phenol-formaldehyde resole resin to the thermoset stage.

* * * * *